April 12, 1960          J. B. COOK          2,932,687
COAXIAL CONDUCTOR CABLE
Filed Feb. 3, 1958                  2 Sheets-Sheet 1

Inventor:
John Brown Cook
By: Zahl, Baker, York,
Jones & Dithmar
Attorneys

April 12, 1960   J. B. COOK   2,932,687
COAXIAL CONDUCTOR CABLE
Filed Feb. 3, 1958                     2 Sheets-Sheet 2

Inventor:
John Brown Cook
By: Zabel, Baker, York,
Jones & Dithmar
Attorneys.

United States Patent Office 2,932,687
Patented Apr. 12, 1960

2,932,687

COAXIAL CONDUCTOR CABLE

John Brown Cook, North Haven, Conn., assignor to The Whitney Blake Company, Hamden, Conn., a corporation of Connecticut Application February 3, 1958, Serial No. 713,028

5 Claims. (Cl. 174—117)

This invention relates to a multi-pair conductor cable for use in the communications industry, for instance, which cable is designed so as to eliminate interference between adjacent conductor pairs.

It is an object of my invention to provide a cable in which the relationship between the elements of each conductor pair is such as to eliminate interference between adjacent conductor pairs.

It is another object to provide an improved communications cable which comprises a plurality of co-axial pairs.

According to my invention, a co-axial construction is provided in which one conductor of each pair comprises a cylindrical element, such as a wire, and in which the other element of each pair comprises a strip of foil which partially surrounds the cylindrical conductor. The term "co-axial" as used herein refers to the partial surrounding relationship.

It is a further object of this invention to provide an improved tape cable which is capable of being rolled up for convenience in handling, and which is also capable of stacking. In other words, if each cable is considered as a unit of, say, 26 pairs, a plurality of such units can be stacked to provide a multi-unit cable of 100 pairs or more.

According to the present invention, a plurality of cylindrical conductors are arranged side by side and in parallel relationship and are connected to each other by a strip of flexible material, such as a synthetic material of suitable dielectric properties, of which polyethylene resin is an operative example.

Similarly, the foil members of each pair are arranged side by side in longitudinally parallel relationship and are connected to each other by a strip of polyethylene resin or the like. Thus, two separate strip assemblies are provided, one carrying the cylindrical conductors, and the other, the foil conductors.

Each of the above strip elements may be in the form of an extrusion. In the one case, the plastic material is extruded around the cylindrical conductor and serves as the jacket or covering which insulates the cylindrical conductor from the foil conductor.

In the other case, the foil conductors are pre-formed to a U-shape, and the resin material is extruded so as to form a backing for the U-shaped foil element.

The spacing between the conductors of each strip element is such that the two strips may be brought into meshed engagement with each other so that the foil element receives and partially surrounds the insulated cylindrical element. The associated strip elements may then be passed through a die which deforms the foil element so that it wraps itself around the cylindrical element to an extent which provides effective shielding.

As a modification, a single strip which includes a plurality of cylindrical conductors may be joined or meshed with a plurality of separate strips, each of which includes only one foil conductor and a suitable backing. In the alternative, a single strip which includes a plurality of foil conductors may be combined or meshed with a plurality of insulated cylindrical conductors which are otherwise disconnected with each other.

A still further object is to provide a multi-conductor interference free communications cable which is capable of being fabricated by a continuous process.

Other objects, features and advantages will become apparent as the description proceeds.

With reference now to the drawings, in which like reference numerals designate like parts:

Figure 1:
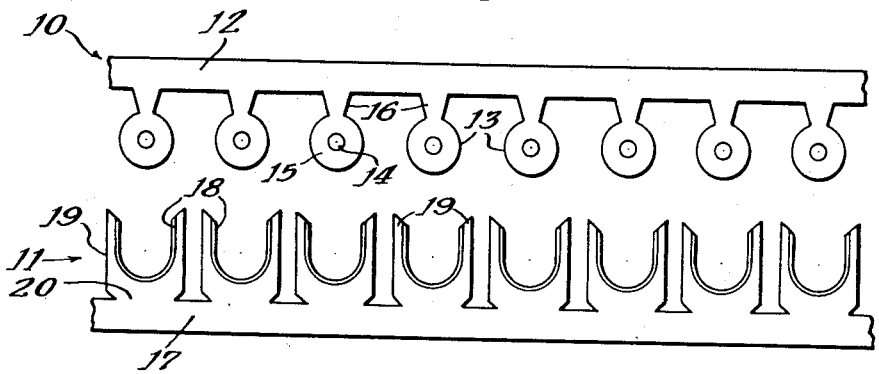
Fig. 1 is an enlarged end view of a preferred embodiment of my invention showing the strip elements in disassembled position.

With reference now to Figs. 1 to 4, the reference numeral 10 designates generally the male strip element or assembly, and the reference numeral 11 designates generally the female strip element or assembly.

The male strip element 10 comprises a tape portion 12, which carries a plurality of insulated conductors 13. The insulated conductors comprise a plurality of cylindrical metallic conductors 14, such as No. 30 copper or aluminum wire, each conductor being surrounded by a covering 15. A connecting portion or web 16 connects the covering 15 with the tape 12.

The elements 12, 15 and 16 preferably constitute portions of an extrusion of a somewhat flexible synthetic or rubber-like material of suitable dielectric properties, such as a polyethylene resin. The characteristics of the material are such that it is suitable for insulating conductors and is sometimes referred to herein as "insulating material." The conductors 14 are embedded in the insulating material during the extruding process in the manner well known in the insulated conductor art.

Thus a strip element is provided which is of indefinite length and which may comprise a plurality of insulated conductors, the strip element being somewhat flexible longitudinally, so as to permit the completed cable to be rolled up on a reel so that it may be handled in the same manner as other cables in this art.

The strip element 11 comprises a base portion, or tape, 17, which carries a plurality of U-shaped foil conductors 18, the latter being formed of copper, or of aluminum, or of any other metallic foil which is suitable for electrical purposes. The foil conductors 18 are each mounted in a U-shaped backing 19 which is connected to the tape portion 17 by a connecting portion 20.

The material of which the portions 17, 19 and 20 are formed may be a suitable insulating material as described above. The strip element 11 may also be an extruded product, although in this instance, it may be preferable to insert the U-shaped foil conductors 18 after the extruding operation.

Figure 2:
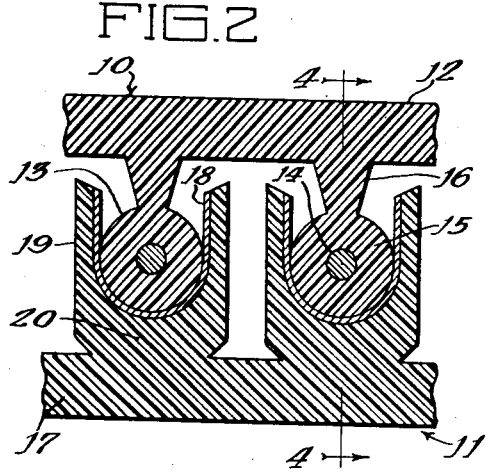
Fig. 2 is an enlarged transverse section of the cable shown in Fig. 1, showing the strip elements in meshed position but before interlocking deformation.

Thus two separate strip elements 10 and 11 are provided, as shown in Fig. 1, in which the spacing between the adjacent conducting elements of each strip is identical so that the two strips can be brought into meshed engagement as shown in Fig. 2.

Figure 3:
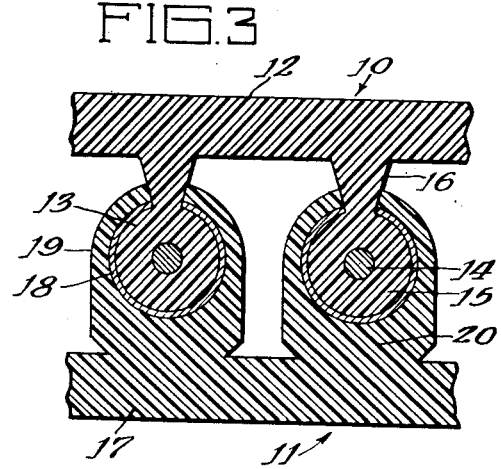
Fig. 3 is a view similar to Fig. 2 but showing the fully assembled cable.
Figure 4:
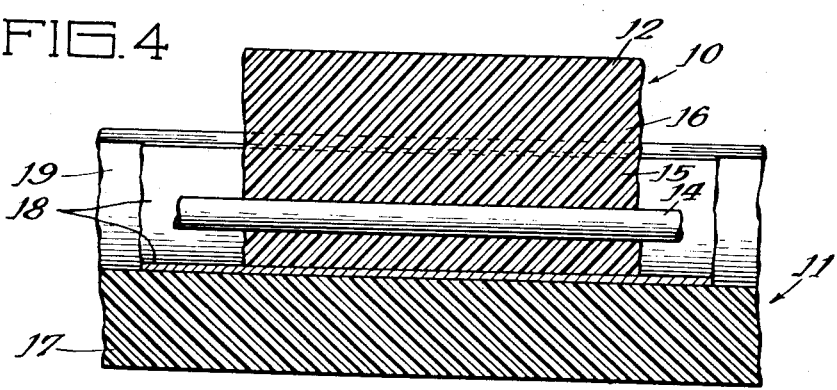
Fig. 4 is a longitudinal section taken along line 4—4 of Fig. 2.

As shown in Fig. 2, the height of the U-shaped members, the foil conductor 18 and the backing 19 is sufficient so that the upper portions of said U-shaped members may be wrapped around the upper portion of the insulated conductor 13 by a suitable deforming operation. In the fully assembled cable, as shown in Fig. 3, the two strips 10 and 11 are positively interlocked by the deforming operation.

Thus each conductor pair comprises a wire 14 which is almost completely surrounded in co-axial relationship by a foil conductor 18, the latter serving as an electrical shield by means of which electrical interference between adjacent and neighboring conducting pairs is avoided.

According to my invention, the cable may be made to rather small dimensions. For instance, the strips 10 and 11 may be a width of only an inch or two, and can be made up so as to provide 26 conductor pairs. The separate cable units can be stacked one on the other, provided that the same relative positions of the U-shaped members are maintained, without causing electrical interference, for the reason that the stacking operation would prevent the open sides from facing each other.

The cable shown herein can be manufactured in a continuous operation by providing two extruders in tandem, a foil slitter behind the second extruder, a foil forming die for inserting the foil strip 18 into the U-shaped backing 19, guide means to bring the two strips together, and a deforming die to fold over the upper ends of the U-shaped elements 18 and 19 to interlock the two strips 10 and 11.

Figure 5:
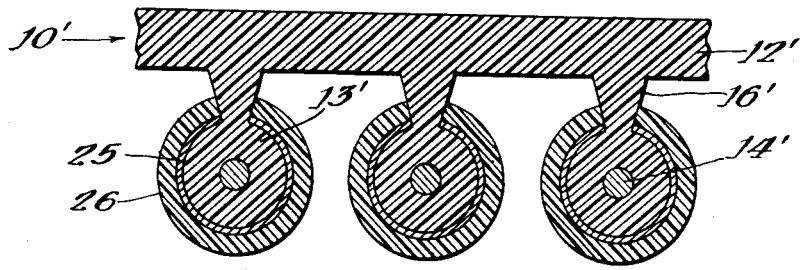
Figs. 5, 6 and 7 are views similar to Fig. 3, but showing three different modifications of my invention.

A modified form of my invention is shown in Fig. 5 which comprises the male strip element 10', and a plurality of separate female elements each comprising a foil conductor 25 and a backing element 26. The latter may be formed in a U-shape, and assembled with and deformed around the insulated conductors 13 in the same manner as pointed out in connection with Figs. 1 to 4. For instance, each female element 25, 26 may comprise a strip of laminated sheet material of which one component is metallic foil and the other component is a film of suitable resin type insulating material, such as polyethylene or such as polyester or mylar. The strip may be initially bent into the desired U-shape and subsequently deformed into interlocking engagement. In other words, the Fig. 5 modification is similar to the construction shown in Fig. 3, except for the presence of the tape portion 17. When fully assembled and interlocked, the tape portion 12' serves to physically connect all of the conductor pairs.

Figure 6:
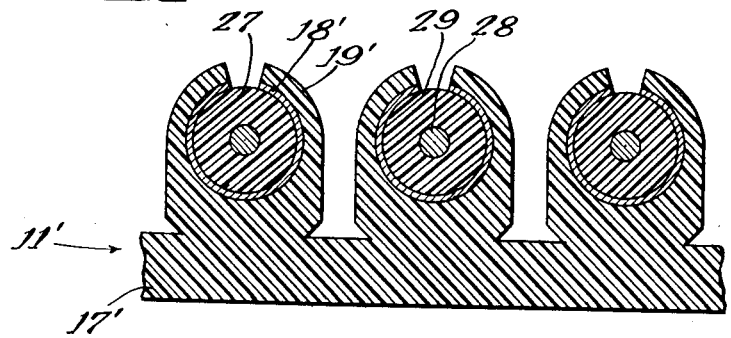

In the modification shown in Fig. 6, the insulated conductors 27 are separate and are assembled with and interlocked with a female strip element 11', the latter serving to physically connect all of the conductor pairs.

Figure 7:
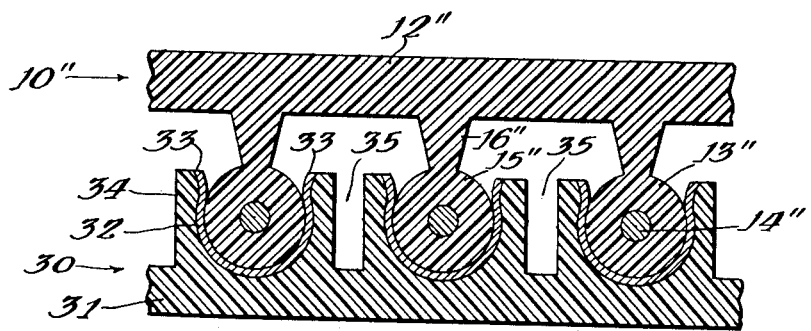

A further modification is shown in Fig. 7 which has the advantage of dispensing with the deforming operation described in connection with the embodiment of Figs. 1 to 4. Here the male strip element 10" is the same as that shown in Figs. 1 to 4, and it is associated with a female strip element 30 which comprises a tape portion 31, a plurality of U-shaped foil conductors 32, and a backing portion 34. The edges 33 of the U-shaped foil conductors extend considerably above the level of the upper tangent to the cylindrical conductor 14" so as to provide effective shielding with respect to adjacent and neighboring conducting pairs. However, the shape of the U-shaped elements 32 and 34 is such as to provide physical contact with the cylindrical surface of the covering 15" for more than 180°. For instance, by shaping the elements as shown in Fig. 7 so that contact is provided throughout an arc of from 210° to 240°, a snapping engagement is provided between strip elements 10' and 30.

In other words, when the two strip elements are brought together by the guide means above mentioned, the insulated conductors 13" may be pressed into the U-shaped elements 32 and 34 to provide the interlocking action desired to maintain the two strip elements in operative relationship. The angular extent of physical contact may be varied according to the various factors which affect the combined resilience of the U-shaped elements 32 and 34, such, for instance, as the physical characteristics of the insulating material, and the width of the slots 35.

This modification also facilitates the separation of the conductors of each pair when connecting the ends to the suitable gang terminals of the type used in connection with tape cables.

In operation, after the cable components have been assembled, the cable may be reeled up for storage and latter use. When the reel diameter is large with respect to the thickness of the cable, any buckling tendency on the part of the foil conductor 18 will be so slight as to have no appreciable effect on the utility or operation of the cable. As previously indicated, several cables may be stacked one on the other to provide a multi-unit interference free cable.

Terminal connections may be made in the usual manner in the case of the insulated conductors 13 after the foil conductors 18 have been separated therefrom. Due to the presence of the U-shaped backing 19, the foil conductors 18 may be readily handled so that a connection can be made with a suitable gang terminal. It will be noted that the insulated conductors 13 can be separated from the web portions 16, or the tape 12 can be slit; similarly, the tape 17 can be slit, thus permitting the ends of the cable to be fanned out to facilitate terminal connections.

Although only preferred embodiments of my invention have been shown and described herein, it will be understood that various modifications and changes can be made in the constructions shown without departing from the spirit of my invention as pointed out in the appended claims.

I claim:

1. A flexible cable comprising two flexible strip assemblies, one strip assembly comprising a base portion in the form of a tape, a plurality of insulating conductors disposed parallel to each other and to said base portion, and a plurality of web portions connecting the insulating material of each insulated conductor to the surface of said base portion, said second strip element comprising a second base portion in the form of a tape, a plurality of U-shaped foil conductors disposed parallel to each other and to said base portion, and backing means for said foil conductors and providing means for connecting said foil conductors to said base portion, the insulated conductors of said first strip element being disposed within said U-shaped foil conductors, and said U-shaped foil conductors being shaped so as to interlock with said insulated conductors in order to maintain said strip assemblies in cooperative relationship with each other, said base portions, web portions, and backing means being formed of insulating material.

2. A flexible multi-pair conductor comprising two extruded flexible strip assemblies formed of a synthetic resin insulating material, said first strip assembly comprising a tape portion and a plurality of insulated conductors connected thereto, and said second strip assembly comprising a tape portion and a plurality of U-shaped elements connected thereto, each U-shaped element comprising a U-shaped strip of conductive metallic foil and a U-shaped backing portion formed of said synthetic resin insulating material and connected at its base to said second tape portion, each insulated conductor being disposed within a U-shaped element and each U-shaped element having end portions interlocking with its associated insulated conductor to maintain said strip assemblies in connected relationship.

3. A flexible multi-pair as claimed in claim 2 in which said U-shaped elements are resilient.

4. A flexible multi-pair conductor as claimed in claim 2 in which said end portions of said U-shaped elements are permanently deformed.

5. A flexible multi-pair conductor cable comprising a plurality of inner elements, each comprising an insulated conductor arranged side by side in parallel arrangement, a plurality of U-shaped outer elements, one for each inner element, and each comprising a strip of conductive metallic foil having a U-shaped outer backing of insulating material, each of said outer elements being partially wrapped around one of said inner elements in interlocking engagement therewith, the insulating material of each of said inner elements being extended to provide a connecting portion, and a flexible base portion in the form of a tape formed of insulating material, and being integrally formed with and connected to said connecting portions of said inner elements, whereby each pair of interlocking inner and outer elements constitutes a coaxial conductor pair.

References Cited in the file of this patent

UNITED STATES PATENTS

| 1,444,057 | Bosley | Feb. 6, 1923 |
| 2,704,302 | Budd | Mar. 15, 1955 |
| 2,754,350 | Hurd | July 10, 1956 |

FOREIGN PATENTS

| 1,033,825 | France | Apr. 8, 1953 |